Oct. 30, 1956
F. A. W. LEFFER
2,768,614
HEATER FOR FLUIDS
Filed Aug. 29, 1952
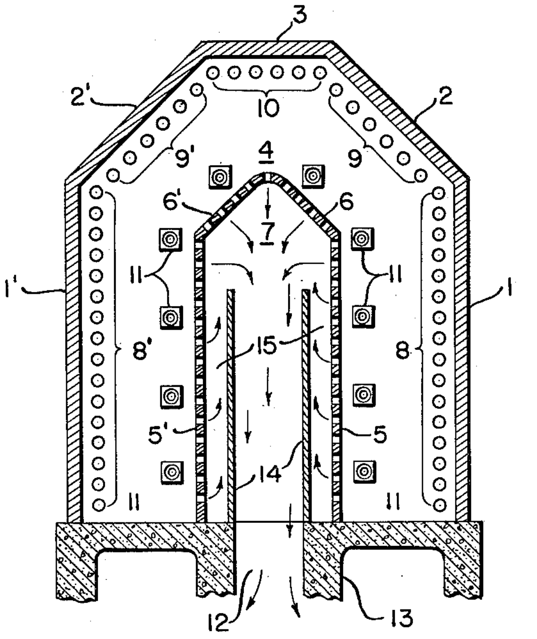
INVENTOR:
FREDERICK A. W. LEFFER
BY:
Chester J. Giuliani
Philip T. Liggett
ATTORNEYS:

United States Patent Office 2,768,614

Patented Oct. 30, 1956

2,768,614

HEATER FOR FLUIDS

Frederick A. W. Leffer, Riverside, Ill., assignor to Universal Oil Products Company, Chicago, Ill., a corporation of Delaware Application August 29, 1952, Serial No. 307,147

2 Claims. (Cl. 122—235)

This invention relates to an improved form of the radiant type of heater and more specifically is directed to a heating appartus which substantially eliminates convection heating of the fluid conduits.

The usual form of heater, particularly for hydrocarbon conversion processes, utilizes radiant heating from flames and hot combustion gases in order to obtain rapid heating of the hydrocarbon fluids, including vapors or gases, to high reaction temperatures. However, the usual form of heater also is constructed and arranged such that there is a considerable amount of convection heating of the fluid conduits or tubular members along with the radiant heating. While convection heating, along with radiant heating, is of advantage in obtaining maximum heat transfer rates and high efficiencies, there may be some disadvantages and damage from combustion gases in a heating chamber. For example, in burning heavy asphaltic oils, or those containing vanadium or other corrosive components, there is damage to the tubes of the heater and to the tube supporting means. Since the corrosive products are carried primarily with the combustion gases and the convection gas stream, it is in many instances desirable to preclude the combustion gases from contacting the tubes and the tube supporting means.

It is thus a principal object of the present improved heater to provide means for removing resulting combustion gases directly from the heating chamber and in a direction away from the radiant-heated tubes therein.

It is also an object of the present invention to provide means for effecting the transfer of high temperature reflected radiant heat to the fluid conduits in a manner such that corrosive combustion gases are prevented from contacting the tubular members or the tube supporting means.

It is a still further object of the invention to provide one or more perforate heat reflecting walls within the furnace chamber adjacent the burner means so that there may be high temperature radiant heat reflected to the furnace tubes, while at the same time damaging combustion gases may be withdrawn from the heating chamber away from the tubular members.

In a broad embodiment, the present heater comprises in combination, refractory outer side and end walls defining a furnace chamber, at least one internal perforate reflector wall spaced from the walls of the chamber, and providing at least one confined radiant heating zone therein, a plurality of spaced fluid conduits positioned within the radiant heating zone adjacent the outer walls thereof and opposing the perforate reflector wall, burner means projecting into the interior of the furnace chamber adjacent the perforate reflector wall and arranged to heat the latter, whereby to effect radiant heating of the fluid conduits while resulting hot combustion gases pass through the perforations of the reflector wall and flow directly away from the conduits.

Preferably, the perforate wall parallels the side walls of the heating chamber such that the tubes or fluid conduits may in turn parallel the side walls of the chamber and be arranged in banks or rows which permit each tubular member to be substantially equidistant from the reflecting surface of the wall and receive substantially equal heat inputs. Also, the heater arrangement is preferably such that two spaced perforate walls or portions thereof extend parallel with one another, or alternatively, that a single wall is arranged in an arch or other enclosing arrangement providing space to accumulate resulting hot combustion gases and discharge them from the heater chamber. The plurality of burners supplying the heat to the chamber may project into the heater chamber from the ends thereof in a substantially horizontal manner, or alternatively, may be arranged along the length of the perforate wall or walls such that the high temperature flame and gases project in an upward or downward direction against the perforate wall, whereby radiant heat is reflected to the tubular members and resulting combustion gases may be withdrawn directly through perforations and away from the tubular members.

Additional features and advantages of the present improved construction will be more apparent upon reference to the accompanying drawing and following description thereof.

The drawing is a sectional elevational view through one embodiment of the improved radiant heater, having spaced vertically disposed parallel internal reflecting walls.

Referring now specifically to the drawing, there is shown a heating chamber having refractory side walls 1 and 1', upper sloping walls 2 and 2', and a top portion 3 which, together with end walls 4, define the exterior of the heating chamber. The refractory walls may be constructed of heat resistant suspended tile, or of panels of insulating concrete and the like. Suitable supporting steel framework may, of course, be provided around the heating chamber, but is not indicated in the present diagrammatic drawing.

Extending parallel with the side walls 1, and within the heating chamber, are spaced perforate heat reflecting walls 5 and 5', while connecting the upper portions of the two walls are suitable sloping perforate wall portions 6 and 6'. There is thus provided a confined radiant heating zone between the perforate walls and the exterior walls of the heating chamber, and an inner combustion gas withdrawal zone 7. Tubular members or conduits, accommodating the one or more fluid streams to be subjected to high temperature radiant heating, are placed in a substantially continuous row closely adjacent the entire inner periphery of the wall and roof portions of the heating chamber. More specifically, a vertical row of horizontally disposed tubular conduits 8 extends closely adjacent the outer wall 1 and a vertical row of horizontally disposed tubular conduits 8' extends closely adjacent side wall 1'. Similarly, tube banks 9 and 9' extend parallel with and closely adjacent the respective sloping walls 2 and 2', while the horizontal roof tubes 10 extend adjacent the upper roof portion 3. It is, however, to be understood that the present improved radiant heating arrangement is not to be limited to the use of a single row of tubes following the inner periphery of the heating chamber, nor to any predetermined number of tubular members, for obviously the tubes or conduits may be placed in staggered rows adjacent the outer walls in a manner opposing the inner reflecting walls and suitable for receiving high temperature radiant heating from the inner walls.

A plurality of burners 11 are indicated in the present embodiment as projecting into the interior of the heating chamber from the end walls 4, so that the inner perforate walls may receive the high temperature flame and combustion gases directly from the burners. The burners 11 are positioned closely adjacent the vertical reflector walls 5 and 5′, as well as the sloping perforate walls 6 and 6′, and away from the fluid conduits of the heating chamber so that in accordance with the present invention, resulting flames and combustion gases from the plurality of burners are precluded from contacting the tubes of the chamber. The resulting combustion gases from the burners are withdrawn directly through the perforations of the reflecting walls so that they are not permitted to fill the whole of the interior of the heater chamber with a turbulent mass of combustion gases or flow against any of the tubular members therein and cause undesired corrosive action. The surfaces of the reflector walls do, however, supply high temperature radiant heat to all of the tubular members in the chamber and, together with the flames, provide all of the advantages of rapid heat transfer by radiation to the tubular members as desired in connection with furnaces for heating hydrocarbon oils and the like. The tubular conduits receive and absorb radiant heat while immersed in a fairly stagnant or quiescent gaseous atmosphere. The combustion gases which pass through the perforate walls to the collecting zone 7 are accumulated and discharged downwardly through a flue gas outlet 12 within the heater foundation 13. Although not shown in the present drawing, additional suitable flue gas outlet passageways or ducts may be provided to transfer the gases from outlet 12 to a furnace stack.

Another feature of the present embodiment is the positioning of spaced parallel deflector plates 14, within or back of the side perforate reflector walls 5 and 5′. The deflector plates are spaced from the latter so as to provide gas passageways 15 paralleling the interior of the reflector side walls 5 and 5′ for a substantial portion of their vertical height. By this arrangement the hot combustion gases are retained within the heating chamber for a longer period of time and sweep upwardly back of the side reflector walls 5 and 5′ to in turn impart additional heat to these walls which may in turn be reflected to the tubular members of the heating chamber. All of the resulting flue gases from the plurality of burners 11 are thus collected in the upper portion of the inner confined zone 7 and pass together in a single stream down between walls 14 to the outlet duct 12.

Inasmuch as the present invention provides a construction and arrangement which will preclude flames and flowing combustion gases from coming into close contact with the fluid conduits of the heater, the spaced burners 11 are preferably positioned a considerable distance from the fluid conduits. In other words, the burners should be spaced from the reflector walls a distance which is not more than about one-half of and more advantageously of the order of one-third of the perpendicular distance between the axis of the burners 11 and the adjacent fluid conduits.

I claim as my invention:

1. A heater for fluids comprising in combination refractory outer walls defining a substantially rectangular heater chamber, a reflector wall positioned within said heater chamber and having two spaced portions substantially paralleling and spaced from opposing side walls of said furnace chamber and having spaced perforations over substantially the entire area thereof, said spaced perforate reflector wall portions and said opposing outer walls defining radiant heating zones, a plurality of spaced fluid conduits positioned within said radiant heating zones adjacent said side walls directly opposite and in radiant heat receiving relationship to said reflector wall portions, burner means projecting into the radiant heating zones of said heater chamber between said spaced perforate reflector wall portions and said conduits, said burners arranged to impinge hot flames and gases on said reflector walls and provide high temperature radiant heat for said fluid conduits, while resulting hot combustion gases pass through the perforations of said reflector wall and pass from said heater chamber away from said fluid conduits, and a deflector plate paralleling and spaced from each of said perforate reflector wall portions on the sides of the latter opposite said fluid conduits, said deflector plates extending for substantially the full height of said reflector wall portions and thereby forming flue gas passageways along the back sides of the reflector wall portions.

2. The heater of claim 1 further characterized in that said burner means comprises a plurality of burners projecting into said heater chamber from the ends thereof adjacent said perforate reflector wall whereby resulting hot combustion gases flow laterally through the perforations of said walls away from said fluid conduits.

References Cited in the file of this patent

UNITED STATES PATENTS

| | | |
|---|---|---|
| 2,009,092 | Mekler | July 23, 1935 |
| 2,140,278 | Barnes | Dec. 13, 1938 |
| 2,258,235 | Barnes | Oct. 7, 1941 |
| 2,445,316 | De Lorenzo | July 20, 1948 |
| 2,498,717 | Sherman | Feb. 28, 1950 |
| 2,523,971 | Schutt | Sept. 26, 1950 |